United States Patent
Tanaka et al.

(10) Patent No.: US 9,747,871 B2
(45) Date of Patent: Aug. 29, 2017

(54) PORTABLE TERMINAL DEVICE, PROGRAM, DEVICE SHAKE COMPENSATION METHOD, AND CONDITION DETECTION METHOD

(71) Applicant: MegaChips Corporation, Osaka-shi (JP)

(72) Inventors: Motoyasu Tanaka, Osaka (JP); Kenji Nakamura, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/426,875

(22) PCT Filed: Sep. 10, 2013

(86) PCT No.: PCT/JP2013/074354
§ 371 (c)(1),
(2) Date: Mar. 9, 2015

(87) PCT Pub. No.: WO2014/042143
PCT Pub. Date: Mar. 20, 2014

(65) Prior Publication Data
US 2015/0235631 A1    Aug. 20, 2015

(30) Foreign Application Priority Data

Sep. 11, 2012 (JP) .................... 2012-199815
Sep. 19, 2012 (JP) .................... 2012-206222

(51) Int. Cl.
G09G 5/38       (2006.01)
G06T 7/20       (2017.01)
G06K 9/00       (2006.01)

(52) U.S. Cl.
CPC .......... G09G 5/38 (2013.01); G06K 9/00255 (2013.01); G06K 9/00604 (2013.01); G06T 7/20 (2013.01);
(Continued)

(58) Field of Classification Search
None
See application file for complete search history.

(56) References Cited

U.S. PATENT DOCUMENTS 7,250,966 B1     7/2007  Engelsberg
2008/0267452 A1*  10/2008  Kondo ............... G06K 9/4647
                                              382/103
(Continued)

FOREIGN PATENT DOCUMENTS

JP          6-6666 A      1/1994
JP       2002-539683     11/2002
(Continued)

OTHER PUBLICATIONS

"Making and Receiving FaceTime Calls on Your iPad 2" http://www.dummies.com/how-to/content/making-and-receiving-facetime-calls-on-your-ipad-2.html Archived on Jul. 18, 2012. Retrieved on May 1, 2016 from <https://web.archive.org/web/20120718052024/http://www.dummies.com/how-to/content/making-and-receiving-facetime-calls-on-your-ipad-2.html>.*

(Continued)

Primary Examiner — Zhengxi Liu
(74) Attorney, Agent, or Firm — Oblon, McClelland, Maier & Neustadt, L.L.P.

(57) ABSTRACT

A portable terminal device operable by an operator is provided with a display unit which displays display data, an image capturing unit and an image signal processing unit which acquire image data containing the face of the operator, a detection unit which detects a relative positional change (Continued)

between the display data displayed on the display unit and the face of the operator based on the acquired image data to create change data, a determination unit which determines whether or not the operator is walking, and a display control unit which, in a case where the determination unit has determined that the operator is walking, controls a displaying position in the display unit of the display data displayed on the display unit so that the relative positional change detected by the detection unit is suppressed.

8 Claims, 10 Drawing Sheets

(52) U.S. Cl.
CPC .............. *G06T 2207/30201* (2013.01); *G09G 2320/08* (2013.01); *G09G 2340/0464* (2013.01); *G09G 2340/14* (2013.01); *G09G 2354/00* (2013.01)

(56) References Cited

U.S. PATENT DOCUMENTS

| | | | |
|---|---|---|---|
| 2011/0149016 A1 | 6/2011 | Kimura | |
| 2011/0298936 A1* | 12/2011 | Watanabe | H04N 5/23219 348/208.4 |
| 2014/0002681 A1* | 1/2014 | Campbell | H04N 5/23267 348/208.99 |
| 2014/0303687 A1* | 10/2014 | Wall, III | A61F 9/08 607/54 |

FOREIGN PATENT DOCUMENTS

| | | |
|---|---|---|
| JP | 2006-5533 A | 1/2006 |
| JP | 2008-269471 A | 11/2008 |
| JP | 2009-188953 A | 8/2009 |
| JP | 2010-268343 | 11/2010 |
| JP | 2011-097344 | 5/2011 |
| JP | 2011-97344 A | 5/2011 |
| JP | 2011-130327 | 6/2011 |
| JP | 2011-186846 | 9/2011 |
| JP | 2011-186846 A | 9/2011 |
| JP | 2011-257502 | 12/2011 |
| JP | 2011-258191 A | 12/2011 |
| JP | 2012-58847 A | 3/2012 |

OTHER PUBLICATIONS

Zhang, Lijing, and Yingli Liang. "Motion human detection based on background subtraction." Education Technology and Computer Science (ETCS), 2010 Second International Workshop on. vol. 1. IEEE, 2010.*

International Preliminary Report on Patentability and Written Opinion issued Oct. 15, 2013 in PCT/JP2013/074354 (with English Translation).

International Search Report Issued Oct. 15, 2013 in PCT/JP13/074354 Filed Sep. 10, 2013.

Japanese Office Action issued May 24, 2016 in Patent Application No. 2012-206222 (with English language translation).

Japanese Office Action issued Jul. 26, 2016 in Patent Application No. 2012-199815 (with English language translation).

Office Action issued in Japanese Application No. 2012-199815 on Nov. 8, 2016.

Office Action issued in Japanese Application No. 2012-206222 on Nov. 15, 2016.

International Search Report dated Oct. 15, 2013 in PCT/JP13/074354 Filed Sep. 10, 2013.

* cited by examiner

PORTABLE TERMINAL DEVICE, PROGRAM, DEVICE SHAKE COMPENSATION METHOD, AND CONDITION DETECTION METHOD

TECHNICAL FIELD

The present invention relates to a technique for compensating device shake generated when a walking operator uses a portable terminal device. Moreover, the present invention relates to a technique for detecting a condition of the portable terminal device.

BACKGROUND ART

Computers each of which is expected to be held by a user, such as cell phones, smartphones, and electronic book view devices (hereinafter, collectively referred to as "portable terminal devices") are widely used these days. The portable terminal devices have an advantage of being usable by an operator while the operator is moving or walking, thereby enabling the operator to effectively use the time during moving or walking. However, there is a problem that, when the walking operator uses the portable terminal device, the device shake is caused by the walking movement of the operator and therefore the screen shake is also generated, making it difficult for the operator to watch the screen.

Techniques for improving the visibility of the screen when the screen is shaking have been proposed. For example, Patent Literature 1 describes an image capturing device which determines whether or not an object in captured image data is not shaking and stable and, in a case where the object is not stable, moves a zoom lens toward a wide end to enlarge the image data.

Moreover, applications actively using virtual reality have appeared as applications provided by computers. Some of the applications using virtual reality use the fact that the portable terminal device is held by the operator, detect the actual motion of the operator by the motion of the portable terminal device, and provide a field of view (display on a display unit) in a virtual world in accordance with the motion of the operator. Furthermore, other applications have also appeared, which estimate the motion of the operator from the motion of the portable terminal device and display a map for route guidance while moving the map in real time in accordance with the motion of the operator. In those applications, it is important how accurately the detection of the motion of the portable terminal device can be performed.

As a technique for detecting the motion of the portable terminal device, a technique is conventionally known which uses GPS, an acceleration sensor (for example, Patent Literature 2), a rotation sensor or the like. Moreover, a technique has appeared which detects the motion of the portable terminal device by an image captured by the portable terminal device. For example, Patent Literature 3 describes a technique which detects a face of a person using the portable terminal device and determines the displaying direction on a display unit to correspond to the axis of the face of that person. That is, the relative positional relationship between the portable terminal device and the axis of the user's face is determined by detection of the captured user's face, and is used as information for automatically changing the displaying direction on the display unit.

Patent Literature 1: JP 06-6666 A
Patent Literature 2: JP 2012-058847 A
Patent Literature 3: JP 2011-258191 A

SUMMARY OF INVENTION

Problems to be Solved by the Invention

However, the conventional technique has a problem that, when the device shake has been detected, the screen shake is not suppressed by only enlarging of the contents displayed in the screen. While the screen is shaking, a problem of causing eyestrain is not solved even if the contents in the screen can be understood. Moreover, when being enlarged, the contents displayed in the screen (displayed portion) are decreased, thus causing a problem of increasing the frequency of the screen change.

In addition, GPS has a problem that it cannot perform accurate motion detection in a location where there is a difficulty in receiving a GPS signal, for example, in an underground shopping area or indoors. GPS also has a problem that, because of its low detection accuracy (about 1 meter), small motion in an electronic book viewer application (from several tens of centimeters to several centimeters), for example, cannot be subjected to detection by GPS and therefore applications are limited. Furthermore, an acceleration sensor (including a rotation sensor using an acceleration sensor) has a problem that, because it is influenced by motion of a body other than the motion of the portable terminal device, for example, in a vehicle, it cannot be used in an application that tries to detect the relative motion between the operator and the portable terminal device, for example, in some conditions. In addition, in a case of a rotation sensor using a magnetic sensor, there is a problem that the detection accuracy is lowered by the effects of magnetism in the surroundings. Furthermore, the technique which decides the displaying detection from the captured image of the face has a problem that it cannot detect complicated motion and the range of use (only the displaying direction is decided) is limited.

As described above, accurate detection of the motion of the portable terminal device cannot be surely achieved by employing any one of the techniques. Instead, it is necessary to find out the condition where the portable terminal device is placed and to properly employ the detection technique in accordance with that condition. Moreover, for finding out the condition of the portable terminal device (operator), any one of the techniques is insufficient. Instead, it is necessary to complementarily perform detection by using various techniques in a superimposed way.

Means for Solving the Problems

In order to solve the above problems, the invention is directed to a portable terminal device operable by an operator. The portable terminal device includes: a display unit configured to display an image; an image acquisition unit configured to acquire image data containing a face of the operator; a detection unit configured to detect a relative positional change between the image displayed on the display unit and the face of the operator based on the image data acquired by the image acquisition unit; a determination unit configured to determine whether or not the operator is walking; and a display compensation unit configured to, in a case where it has been determined by the determination unit that the operator is walking, control a displaying position in the display unit of the image displayed on the display unit to suppress the relative positional change detected by the detection unit.

The invention is directed to the portable terminal device, wherein the image acquisition unit acquires the image data containing an eyeball of the operator, and the detection unit detects a move of the eyeball of the operator based on the image data acquired by the image acquisition unit, to detect the relative positional change between the image displayed on the display unit and the face of the operator.

The invention is directed to the portable terminal device, wherein the detection unit detects a change amount in the relative positional change.

The invention is directed to a recording medium having a computer-readable program recorded therein. The computer-readable program, when executed by a computer, causes the computer to function as a portable terminal device including: a display unit configured to display an image; an image acquisition unit configured to acquire image data containing a face of the operator; a detection unit configured to detect a relative positional change between the image displayed by the display unit and the face of the operator based on the image data acquired by the image acquisition unit; a determination unit configured to determine whether or not the operator is walking; and a display compensation unit configured to, in a case where it has been determined by the determination unit that the operator is walking, control a displaying position in the display unit of the image displayed on the display unit to suppress the relative positional change detected by the detection unit.

The invention is directed to a device shake compensation method for detecting a condition of a portable terminal device, including: displaying an image on a display unit of the portable terminal device; acquiring image data containing a face of the operator of the portable terminal device; detecting a relative positional change between the image displayed by the display unit and the face of the operator based on the acquired image data; determining whether or not the operator is walking; and, in a case where it has been determined that the operator is walking, controlling a displaying position in the display unit of the image displayed on the display unit to suppress the detected relative positional change.

The invention is directed to a portable terminal device operable by an operator, including: an image acquisition unit configured to acquire image data by capturing surroundings; a detection unit configured to detect a motion of an object in the image data based on detection object data that is a portion obtained by removing face data representing a face of the operator from the image data acquired by the image acquisition unit; and a condition determination unit configured to determine a condition of the operator in accordance with the motion of the object detected by the detection unit.

The invention is directed to the portable terminal device, further including a control unit configured to control an operation of the portable terminal device in accordance with the condition of the operator determined by the condition determination unit.

The invention is directed to the portable terminal device, wherein the condition of the operator includes whether or not the operator is walking.

The invention is directed to the portable terminal device, wherein the condition of the operator includes whether or not the operator is moving on a vehicle.

The invention is directed to the portable terminal device, wherein the detection unit detects the motion of the object based on the detection object data that is a portion of the image data acquired by the image acquisition unit after person data representing a person other than the operator is excluded from the image data.

The invention is directed to the portable terminal device, wherein the detection unit detects an amount of move of each pixel based on the detection object data before and after move of the object.

The invention is directed to the portable terminal device, wherein the detection unit obtains the number of pixels for every amount of the move of each pixel based on the detected amount of the move of each pixel, and detects the motion of the object in accordance with the amount of the move of each pixel of the largest number of pixels.

The invention is directed to a recording medium having a computer-readable program recorded therein. The computer-readable program, when executed by a computer, causes the computer to function as a portable terminal device including: an image acquisition unit configured to acquire image data by capturing surroundings; a detection unit configured to detect a motion of an object in the image data based on detection object data that is a portion obtained by removing face data representing a face of the operator from the image data acquired by the image acquisition unit; and a condition determination unit configured to determine a condition of the operator in accordance with the motion of the object detected by the detection unit.

The invention is directed to a condition detection method for detecting a condition of a portable terminal device, including: acquiring image data by capturing surroundings; detecting a motion of an object in the image data based on detection object data that is a portion obtained by removing face data representing a face of the operator from the acquired image; and determining a condition of the operator in accordance with the detected motion of the object.

Advantageous Effects of Invention

In the inventions, the relative positional change between the image displayed on the display unit and the face of the operator is detected based on the acquired image data, and the displaying position in the display unit of the image displayed on the display unit is controlled so that the detected relative positional change is suppressed in a case where it has been determined that the operator is walking. Thus, it is possible to display the image while the device shake during walking is suppressed.

In the inventions, the motion of the object in the acquired image data is detected based on the detection object data that is the remaining portion of the acquired image data after the face data representing the face of the operator is excluded from the acquired image data, and the condition of the operator is determined in accordance with the detected motion of the object. Thus, it is possible to detect the condition of the operator even if an acceleration sensor is not provided or the output of the acceleration sensor is not reliable.

Figure 1:
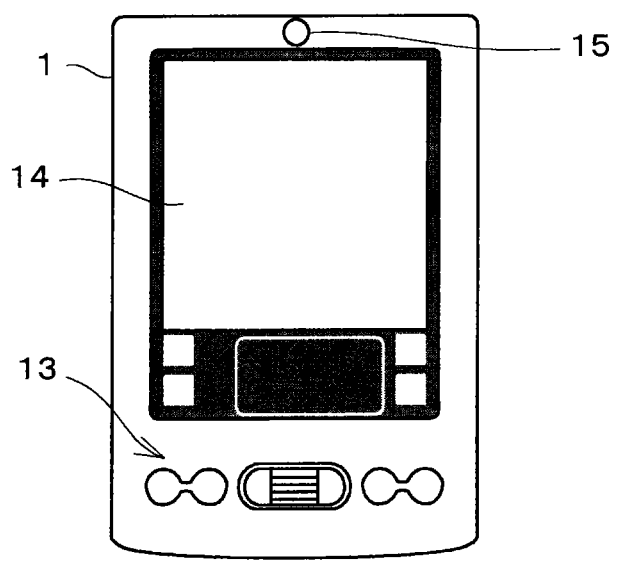
FIG. 1 shows the appearance of an exemplary portable terminal device in a preferred embodiment.

DESCRIPTION OF REFERENCE SIGNS 1, 1a, 2 Portable terminal device
10, 20 CPU
100 Determination unit
101, 101a, 201 Detection unit
102 Display control unit (display compensation unit)
11, 21 ROM
110, 210 Program
12, 22 RAM
120 Measurement data
121 Determined data
122, 122a Change data
123 Display data (image)
13, 23 Operation unit
14, 24 Display unit
15, 25 Image capturing unit
16, 26 Image signal processing unit
160, 260 Image data
17 Group of sensors
200 Data creation unit
202 Condition determination unit
221 Detection object data
222 Face data
223 Person data
226 Move data
229 Determination data
261, 262, 263, 264 Object
269 Directions

BEST MODE FOR CARRYING OUT THE INVENTION

Hereinafter, preferred embodiments of the present invention are described in detail, referring to the accompanying drawings. In the following description, the description of directions and orientations correspond to those in the drawings for convenience of description unless otherwise specified, but do not limit the products practicing the claimed invention, products, the scope of the right, or the like.

Figure 2:
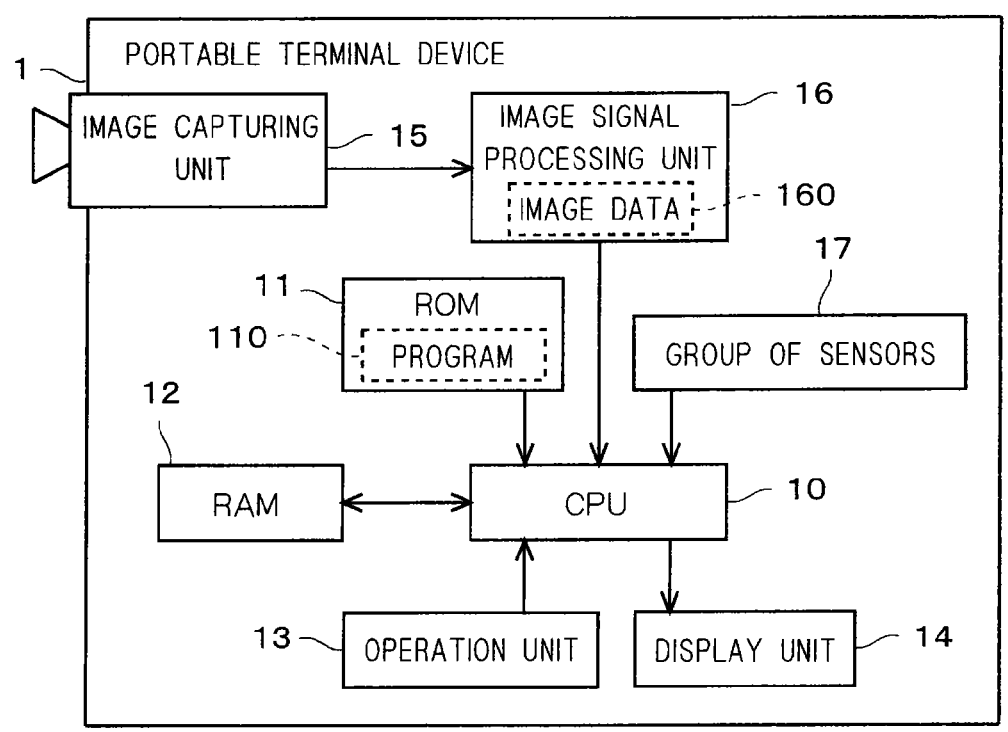
FIG. 2 is a block diagram of the portable terminal device in the preferred embodiment.

FIG. 1 shows the appearance of an exemplary portable terminal device 1 according to a preferred embodiment. FIG. 2 is a block diagram of the portable terminal device 1 in the preferred embodiment. As shown in FIG. 1, the portable terminal device 1 is a device designed to be able to be carried by an operator, and is operated by the operator.

The portable terminal device 1 includes a CPU 10 which processes various types of information and controls respective components provided in the portable terminal device 1 by generating control signals, a ROM 11 which stores a program 110 to be executed by the CPU 10, and a RAM 12 to be used as a temporal working area of the CPU 10. Thus, the portable terminal device 1 has the structure and functions as a general computer.

The operation and functions of the CPU 10 will be described later. The RAM 12 is a typical example of a storage device from which data can be read and on which data can be written, but there is no intention to limit the storage device provided in the portable terminal device 1 to a relatively small capacity storage device which allows a rapid access (i.e., RAM 12). The portable terminal device 1 may include a non-volatile storage device, a storage device which allows a relatively low speed access only, a large capacity storage device, or the like, other than the RAM 12, or may be configured to allow the use of a portable storage medium to/from which can be attached and detached.

The portable terminal device 1 also includes an operation unit 13, a display unit 14, an image capturing unit 15, an image signal processing unit 16, and a group of sensors 17.

The operation unit 13 is buttons, a key, a switch or the like which can be operated by an operator. For example, the operation unit 13 has a power button for turning a power of the portable terminal device 1 on. The operation unit 13 also has a touch panel arranged on a surface of the display unit 14 described later, and enables the operator to input an instruction by touching the screen (i.e., touch panel) of the display unit 14.

The display unit 14 has a function of displaying various types of information for the operator. Examples of the display unit 14 include a liquid crystal display, a liquid crystal panel, a lamp, and a LED.

The image capturing unit 15 includes an optical element such as a lens, and a photoelectric conversion element such as a CCD, although the details thereof are not shown. The image capturing unit has a function of converting light incident through the lens to a digital electric signal and transmitting the digital electric signal to the image signal processing unit 16. The image capturing unit 15 in the preferred embodiment is provided at a position as shown in FIG. 1, for example, and is configured so that the capturing range thereof covers the face of the operator who watches (views) the display unit 14. In other words, in the portable terminal device 1 in the preferred embodiment, the operator's face is captured as an object in image data 160 which is captured while the operator watches the display unit 14 in a normal posture.

The image capturing unit 15 in the preferred embodiment forms a so-called digital camera widely available in the market and has a function of taking a color photograph (video) at a certain moment. However, for implementing the present invention, it is not necessary for the image capturing unit 15 to have a function of capturing an image in which a human eye can recognize an object as in a color photograph. That is, it is enough that a relative distance between an object and the portable terminal device 1 and a change in the orientation can be detected by capturing light (this is not always visible) from the object, and an infrared camera may be used, for example.

The image signal processing unit 16 is hardware which processes an electric signal presenting an image input from the image capturing unit 15 to convert it into image data 160 having a predetermined format. That is, the image data 160 is directly data created by the image signal processing unit 16 and also data captured by the image capturing unit 15. In the portable terminal device 1, the image capturing unit 15 and the image signal processing unit 16 have a function as an image acquisition unit which acquires image data 160 by capturing an image of the surroundings.

In the following description, a portion of the object contained in the image data 160, which is other than the operator, is referred to as a "background". That is, the "background" may contain a person other than the operator. Moreover, the "operator" in the object is described as containing not only the body of the operator but also an article worn by the operator, unless otherwise stated. In a case where the operator wears a cap or a hat, for example, the cap or the hat is the "operator" as the object, not the background.

The group of sensors 17 is formed by an acceleration sensor, a vibration sensor, a gyro sensor, a velocity sensor and the like, and is a group of detectors for detecting the motion of the portable terminal device 1. The respective sensors included in the group of sensors 17 output measurement results thereof as information indicating the motion of the portable terminal device 1. The information output from the group of sensors 17 is particularly used for detecting whether or not the operator is walking.

In the preferred embodiment, the group of sensors 17 formed by a plurality of detectors is described. However, in place of the group of sensors 17, a single detector may be provided. In this case, the cost can be suppressed although the detection accuracy is lowered. Moreover, the sensors exemplified as the detectors forming the group of sensors 17 in the preferred embodiment are merely examples. All of those sensors are not necessarily provided. A sensor other than the above sensors may be employed as the detector for detecting the motion of the portable terminal device 1 (especially, the motion indicating the walking operation of the operator).

Figure 3:
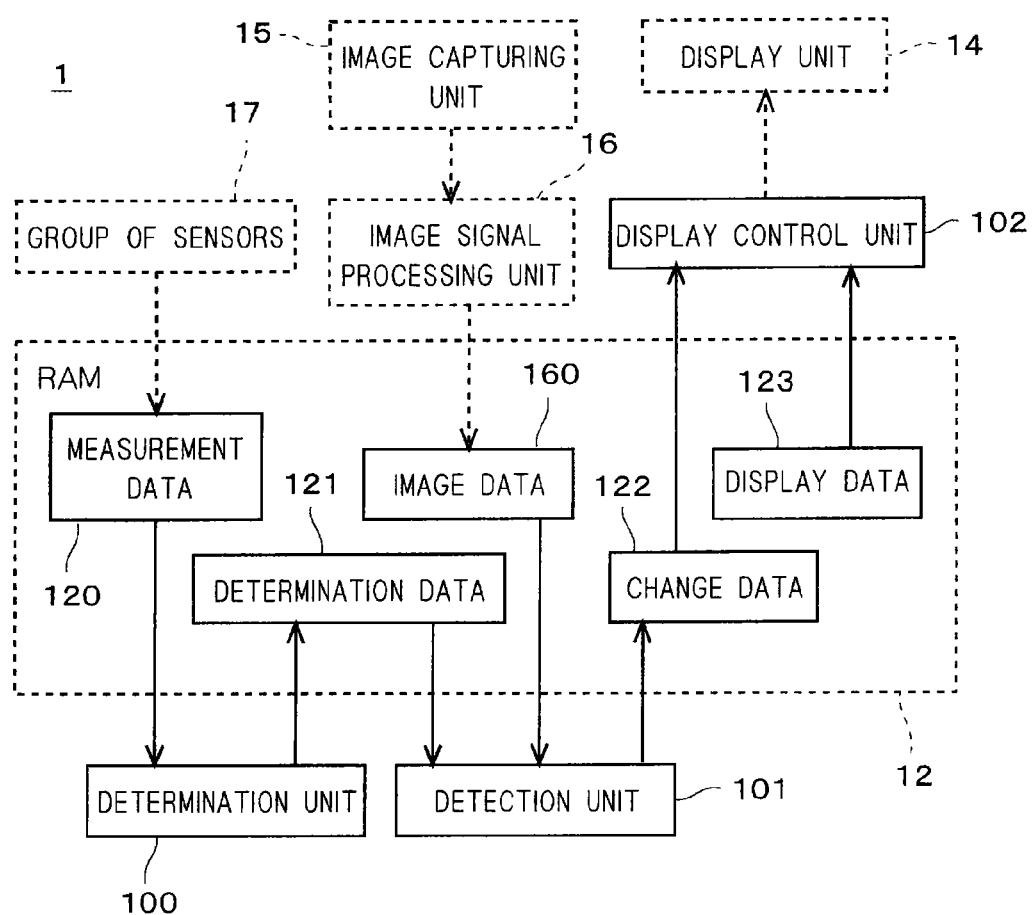
FIG. 3 shows functional blocks provided in the portable terminal device in the preferred embodiment, with a data flow.

FIG. 3 is a diagram showing functional blocks provided in the portable terminal device 1 in the preferred embodiment, together with a data flow. A determination unit 100, a detection unit 101, and a display control unit 102 are functional blocks that are implemented by the CPU 10 operating in accordance with the program 110.

The determination unit 100 determines whether or not the operator is walking, based on measurement data 120 acquired by the group of sensors 17, thereby creating determination data 121. Please note that, to a method for determining whether or not the operator carrying the portable terminal device 1 is walking based on the output (measurement data 120) of the detector (the group of sensors 17) such as the acceleration sensor or the vibration sensor, a conventional technique can be applied as appropriate. Therefore, the details of that method are omitted.

The detection unit 101 detects a relative positional change between an image displayed on the display unit 14 and the operator's face based on the image data 160 acquired by the image capturing unit 15 and the image signal processing unit 16. The relative positional change thus detected is created as change data 122 by the detection unit 101. The principle in which the detection unit 101 detects the relative positional change between the image displayed on the display unit 14 and the operator's face will be described later.

The display control unit 102 has a function of displaying display data 123 at a predetermined displaying position on the display unit 14. The display data 123 is information stored in advance as a portion of an application program or information crated by an application or the like, for example, and is information presenting an image to be displayed on the display unit 14. In the display data 123, the displaying position of each of pixels (image pixels) presenting the image in the screen of the display unit 14 (hereinafter, referred to as a "standard displaying position") is determined. The standard displaying position of each pixel may be changed by an operation of the operation unit 13 or the like by the operator, as long as an application permits. For example, the image presented by the display data 123 may be scrolled or slid on the screen of the display unit 14 by the operation of the operation unit 13 by the operator.

The display control unit 102 refers to the change data 122 and controls the displaying position in the display unit 14 of the image (display data 123) displayed on the display unit 14 to suppress the relative positional change detected by the detection unit 101. That is, the display control unit 102 in the preferred embodiment corresponds to a display compensation unit in the present invention. In the following description, the displaying position of the display data 123 determined by the display control unit 102 based on the change data 122 is referred to as a "compensated displaying position" and is distinguished from the "standard displaying position".

The above is the description of the structure and functions of the portable terminal device 1 in the preferred embodiment. Next, a device shake compensation method for compensating device shake caused by the walking movement of the operator in the portable terminal device 1 is described.

Figure 4:
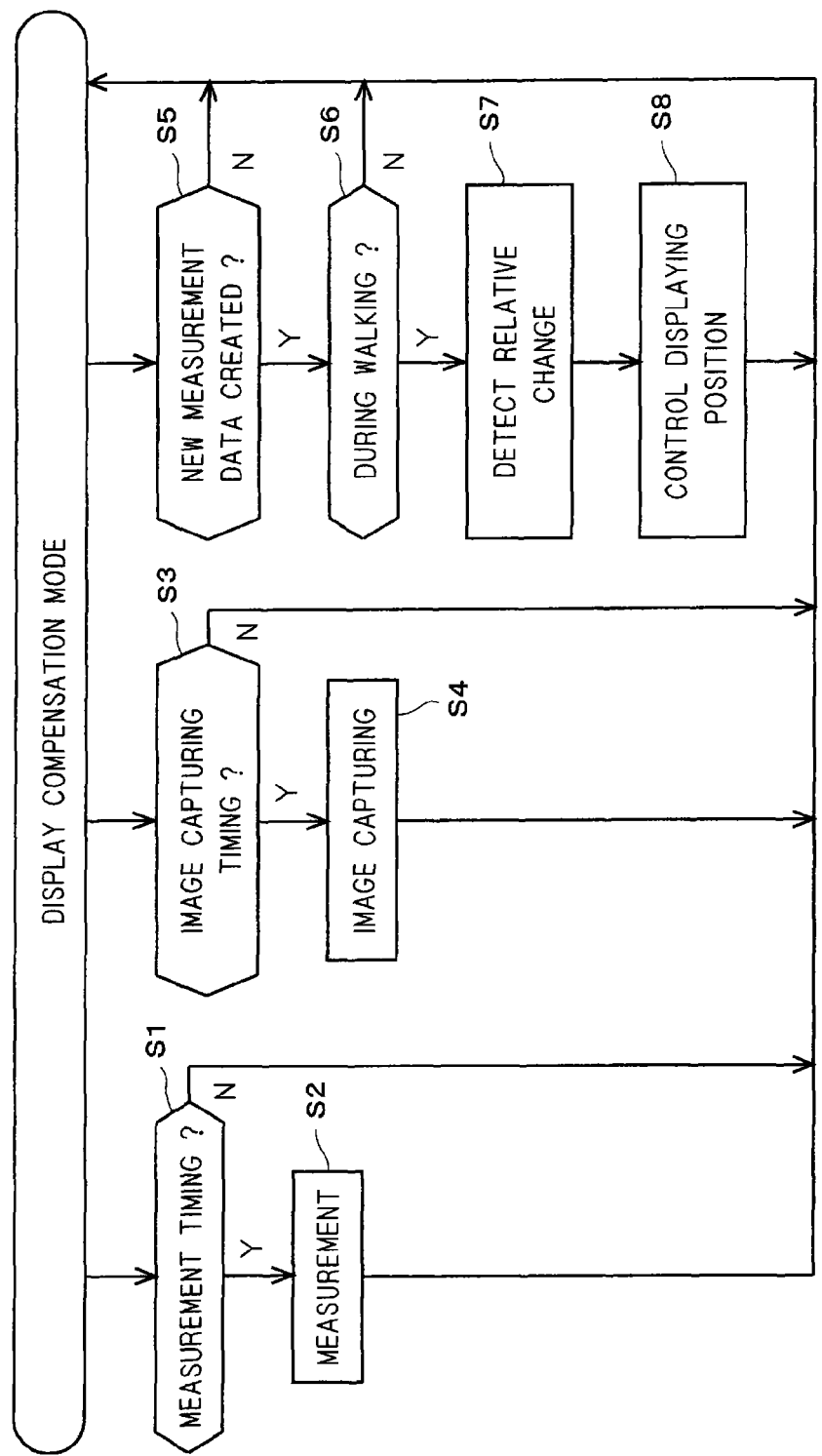
FIG. 4 is a flowchart showing an operation of a display compensation mode of the portable terminal device in the preferred embodiment.

FIG. 4 is a flowchart showing the operation of the portable terminal device 1 in a display compensation mode in the preferred embodiment. The display compensation mode is an operation mode in which the portable terminal device 1 performs compensation with respect to the standard displaying position of the display data 123 in accordance with the walking movement of the operator so that the display data 123 is displayed at the compensated displaying position. It is assumed that before respective steps shown in FIG. 4 are started, the start of the display compensation mode has been instructed in the portable terminal device 1. The start of the display compensation mode is instructed by a direct start instruction by the operator or the startup of an application using that operation mode, for example. Moreover, the display compensation mode is an operation mode which controls the displaying position of the display data 123 in the display unit 14, and is therefore an operation mode which is activated only in a state where the display unit 14 is active (i.e., a state in which any display data 123 is being displayed). However, the step of displaying the display data 123 at the standard displaying position and the like are omitted in FIG. 4.

When the display compensation mode has been started, the portable terminal device 1 is placed in a state where it monitors whether or not a measurement timing has come (Step S1), whether or not an image capturing timing has come (Step S3), and whether or not measurement data 120 has been newly created (Step S5). In the following description, this state is referred to as a "monitoring state".

In the monitoring state, when the measurement timing has come (Yes in Step S1), the group of sensors 17 performs measurement (Step S2) to create measurement data 120. The measurement timing is determined in accordance with a preset measurement period. That is, in the display compensation mode in the portable terminal device 1, a measurement process (Step S2) by the group of sensors 17 occurs every measurement period, thereby the measurement data 120 is created. Please note that it is not necessary for the respective detectors included in the group of sensors 17 to perform measurement at the same time.

In the monitoring state, when the image capturing timing has come (Yes in Step S3), the image capturing unit 15 performs image capturing (Step S4) and the image signal processing unit 16 creates image data 160. The image capturing timing is determined by a preset image capturing period, like the measurement timing. That is, in the display compensation mode in the portable terminal device 1, an image capturing process (Step S4) by the image capturing unit 15 and the image signal processing unit 16 occurs at every image capturing period, thereby the image data 160 is created.

In the monitoring state, when new measurement data 120 has been created (Yes in Step S5), the determination unit 100 determines whether or not the operator is walking based on the newly created measurement data 120 (past measurement data 120 is also included if necessary) (Step S6). In Step S6, the determination unit 100 creates determination data 121 indicative of the determination result.

When it has been determined that the operator carrying the portable terminal device 1 is walking (Yes in Step S6), the detection unit 101 detects the relative positional change between the display data 123 displayed on the display unit 14 and the face of the operator based on the image data 160 (Step S7). That is, while referring to the determination data 121, the detection unit 101 executes Step S7 in a case where the determination data 121 indicates that "the operator is walking".

The principle of detecting the relative positional change between the display data 123 displayed on the display unit 14 and the face of the operator is described here.

In the portable terminal device 1, the standard displaying position of the display data 123 displayed on the display unit 14 is determined with respect to the display unit 14. Therefore, between the standard displaying position of the display data 123 and the display unit 14, the relative positional relationship is fixed. Moreover, while the operator is watching the display unit 14, the relative positional relationship between the portable terminal device 1 and the display unit 14 is fixed because the display unit 14 is fixed in the portable terminal device 1. Furthermore, while the operator is watching the display unit 14, the relative positional relationship between the portable terminal device 1 and the capturing range of the image capturing unit 15 is also fixed because the capturing range of the image capturing unit 15 is fixed in the portable terminal device 1.

Therefore, for detecting the relative positional change between the display data 123 displayed on the display unit 14 and the face of the operator, it is enough to detect the relative positional change between the capturing range of the image capturing unit 15 and the face of the operator. That is, by detecting a change of the face position of the operator as an object in the image data 160 obtained by capturing objects within the image capturing range of the image capturing unit 15, the relative positional change between the display data 123 displayed on the display unit 14 and the face of the operator can be detected.

The detection unit 101 extracts a pixel representing the face of the operator from each of two units of image data 160 at successive image capturing periods, and obtains a change in the position of the pixel between those two units of image data 160. When X-axis and Y-axis crossing each other at right angles are defined in the image data 160, that change of the position is obtained as a change in the X-axis direction "$\Delta x_a$" and a change in the Y-axis direction "$\Delta y_a$". The unit of "$\Delta x_a$" and "$\Delta y_a$" is "pixel". That is, the change of the position is obtained as the number of pixels the position has moved in the image data 160.

Then, the detection unit 101 obtains the distance of actual move ($\Delta x_L$ and $\Delta y_L$) of the portable terminal device 1 caused by the device shake during walking based on "$\Delta x_a$" and "$\Delta y_a$". These can be obtained by Equations 1 and 2, respectively, using a conversion magnification $\alpha_1$ [m/pixel].

$$\Delta x_L = -\alpha_1 \times \Delta x_a \qquad \text{Equation 1}$$

$$\Delta y_L = -\alpha_1 \times \Delta y_a \qquad \text{Equation 2}$$

The conversion magnification $\alpha_1$ is a value indicating to what extent the distance of move caused by the shake of the portable terminal device 1 is reflected when the pixel presenting the face of the operator moves one pixel in the image data 160, and is varied by an image capturing magnification of the image capturing unit 15 or a distance L between the object (the face of the operator) and the image capturing unit 15. The image capturing magnification of the image capturing unit 15 is known, whereas the distance L is unknown strictly. In the portable terminal device 1 in the preferred embodiment, the conversion magnification $\alpha_1$ is determined while the distance L is assumed to be a constant determined in accordance with the length of the human arm (it can be expected to be 20-odd centimeters, for example), and the thus determined conversion magnification $\alpha_1$ is stored in advance. Alternatively, the distance L may be measured with a distance measuring sensor or a 3D camera every time it is needed, and then the conversion magnification $\alpha_1$ may be obtained.

The detection unit 101 creates change data 122 based on the distance of move ($\Delta x_L$ and $\Delta y_L$) of the portable terminal device 1 caused by the device shake during walking, that are obtained from Equations 1 and 2. That is, in Step S7, the change data 122 indicating ($\Delta x_L$ and $\Delta y_L$) are created by the detection unit 101.

When the change data 122 has been created, the display control unit 102 controls the displaying position in the display unit 14 of the display data 123 displayed on the display unit 14 so that the relative positional change detected by the detection unit 101 is suppressed (Step S8). More specifically, based on the (n−1)th compensated displaying position ($X_{(n-1)}$, $Y_{(n-1)}$) that is a current displaying position, the newly created change data 122, and a conversion magnification $\beta$, the display control unit 102 determines the n-th compensated displaying position ($X_n$, $Y_n$) from Equations 3 and 4.

$$X_n = X_{(n-1)} - \beta \times \Delta x_L = X_{(n-1)} + \alpha_1 \times \beta \times \Delta x_a \qquad \text{Equation 3}$$

$$Y_n = Y_{(n-1)} - \beta \times \Delta y_L = Y_{(n-1)} + \alpha_1 \times \beta \times \Delta y_a \qquad \text{Equation 4}$$

n is a natural number equal to or larger than 1, and the 0-th compensated displaying position ($X_0$, $Y_0$) is the standard displaying position. The conversion magnification $\beta$ is a known constant determined in accordance with a distance in an actual space corresponding to one pixel of the move of the displaying position in the display unit 14. The unit of the conversion magnification $\beta$ is [pixel/m].

In Step S8, the display control unit 102 controls the display unit 14 so that the display data 123 is displayed at the compensated displaying position ($X_n$, $Y_n$) thus obtained. Thus, the distance of move of the display data 123 caused by the device shake is canceled out by the change of the displaying position, and the shake of the display screen is suppressed.

As described above, the portable terminal device 1 in the preferred embodiment includes: the display unit 14 which displays the display data 123; the image capturing unit 15 and the image signal processing unit 16 which acquires the image data 160 containing the face of the operator; the detection unit 101 which detects the relative positional change between the display data 123 displayed on the display unit 14 and the face of the operator to create the change data 122, based on the acquired image data 160; the determination unit 100 which determines whether or not the operator is walking; and the display control unit 102 which controls the displaying position in the display unit 14 of the display data 123 displayed on the display unit 14 to suppress the relative positional change detected by the detection unit 101 in a case where it has been determined by the determination unit 100 that the operator is walking. Therefore, the portable terminal device 1 in the preferred embodiment can display the display data 123 for which the device shake during walking is suppressed.

Moreover, the amount of change caused by the device shake, for example, is an amount that can be expected to some extent. Therefore, if at least the direction of the device shake can be detected, the shake of the image caused by the device shake can be also suppressed to some extent by moving and displaying the display data 123 by the expected amount in the direction opposite to the detected direction. However, the detection unit 101 in the preferred embodiment detects the change amount in the relative positional change, thereby being able to accurately compensate the device shake.

In the above preferred embodiment, an example is described in which the device shake caused by the walking of the operator is detected based on the move of the pixel representing the operator's face from the image data 160 obtained by capturing the operator's face. However, in the face of the operator, the eyeball has a characteristic that it reflexively follows a (relatively) moving object. Therefore, the motion of the eyeball of the operator's face is particularly effective as an object from which the motion of an image (image data 123) that is an moving object is detected.

Figure 5:
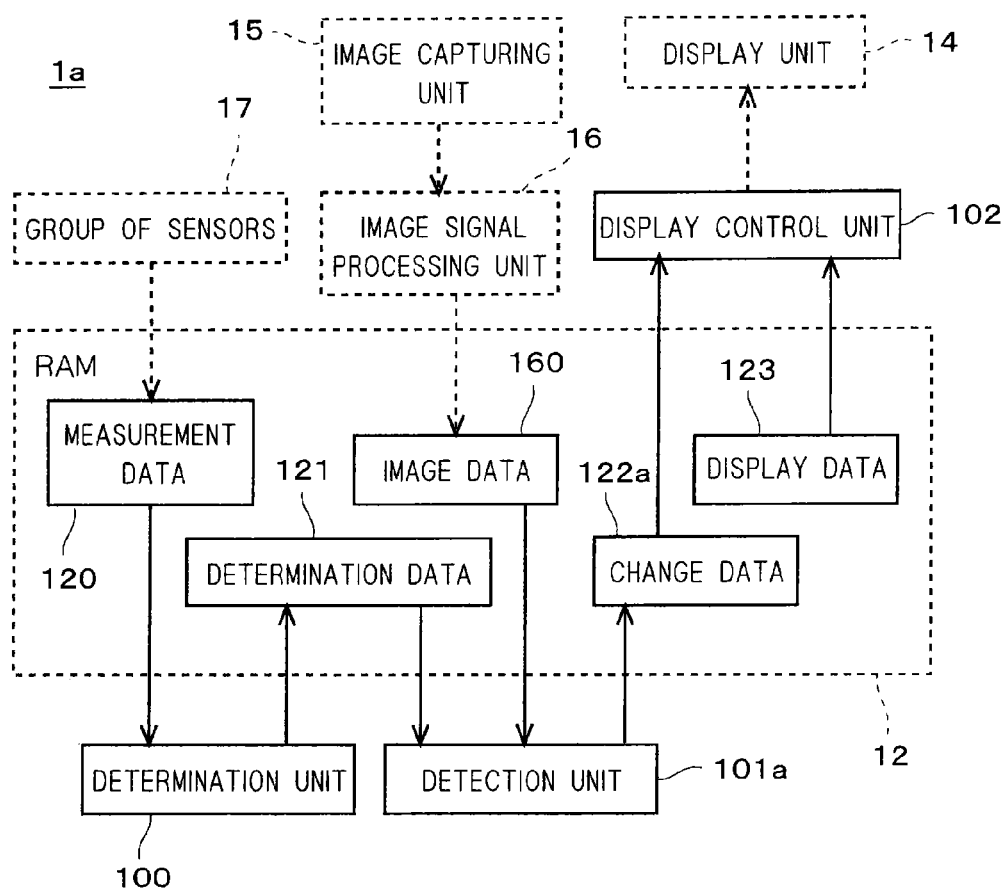
FIG. 5 shows functional blocks provided in a portable terminal device in another preferred embodiment, with a data flow.

FIG. 5 shows functional blocks provided in a portable terminal device 1a in another preferred embodiment, together with a data flow. A detection unit 101a shown in FIG. 5 is a functional block implemented by the CPU 10 operating in accordance with the program 110.

The portable terminal device 1a in the other preferred embodiment is different from the portable terminal device 1 in the above preferred embodiment in that the portable terminal device 1a includes the detection unit 101a in place of the detection unit 101. In the following description, for the portable terminal device 1a in the other preferred embodiment, the same components as those in the portable terminal device 1 in the above preferred embodiment are labeled with the same reference signs and the description thereof is omitted as appropriate.

Based on the distance of move of the eyeball "$\Delta x_b$" and "$\Delta y_b$" of the operator in image data 160 (the distance of move of the pupil), the detection unit 101a in the other preferred embodiment obtains the actual distance of move of the portable terminal device 1 ($\Delta x_L$ and $\Delta y_L$) caused by the device shake during walking. This can be obtained by Equations 5 and 6, using a conversion magnification $\alpha_2$ [m/pixel].

$$\Delta x_L = \alpha_2 \times \Delta x_b \quad \text{Equation 5}$$

$$\Delta y_L = \alpha_2 \times \Delta y_b \quad \text{Equation 6}$$

The conversion magnification $\alpha_2$ is a value indicating to what extent the distance of the move caused by the shake of the portable terminal device 1 is reflected when the pixel representing the eyeball of the operator moves one pixel in the image data 160, and is unknown like the conversion magnification $\alpha_1$ in the above preferred embodiment. However, also in the other preferred embodiment, the conversion magnification $\alpha_2$ is stored in advance as a constant, as in the above preferred embodiment.

The detection unit 101a creates change data 122a based on the distance of the move ($\Delta x_L$ and $\Delta y_L$) of the portable terminal device 1 caused by the device shake during walking, that are obtained from Equations 5 and 6.

When the change data 122a has been created, the display control unit 102 controls the displaying position in the display unit 14 of the display data 123 displayed on the display unit 14 so that the relative positional change detected by the detection unit 101a is suppressed. More specifically, based on the (n−1)th compensated displaying position ($X_{(n-1)}$, $Y_{(n-1)}$) that is a current displaying position, the newly created change data 122, and the conversion magnification $\beta$, the display control unit 102 determines the n-th compensated displaying position ($X_n$, $Y_n$) from Equations 7 and 8.

$$X_n = X_{(n-1)} - \beta \times \Delta x_L = X_{(n-1)} - \alpha_2 \times \beta \times \Delta x_b \quad \text{Equation 7}$$

$$Y_n = Y_{(n-1)} - \beta \times \Delta y_L = Y_{(n-1)} - \alpha_2 \times \beta \times \Delta y_b \quad \text{Equation 8}$$

As described above, the portable terminal device 1a in the other preferred embodiment can also display the display data 123 while the device shake during walking is suppressed, as in the portable terminal device 1 in the preferred embodiment.

Moreover, the image capturing unit 15 and the image signal processing unit 16 acquire the image data 160 containing the eyeball of the operator and the detection unit 101a detects the motion of the eyeball of the operator based on the acquired image data 160, thereby detecting the relative positional change between the display data 123 displayed on the display unit 14 and the face of the operator. Thus, the device shake can be accurately compensated.

Figure 6:
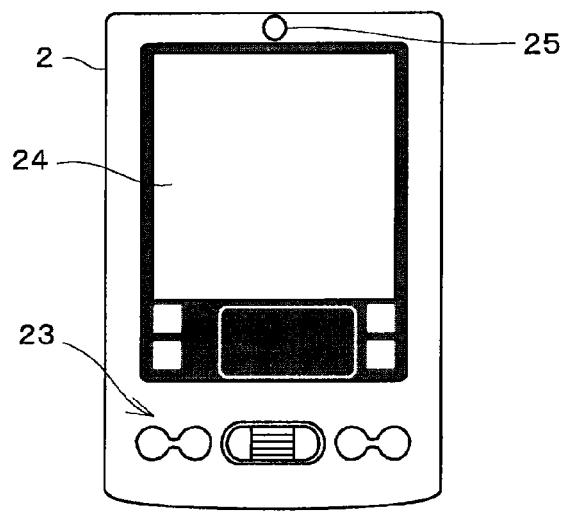
FIG. 6 shows the appearance of an exemplary portable terminal device in a still another preferred embodiment.
Figure 7:
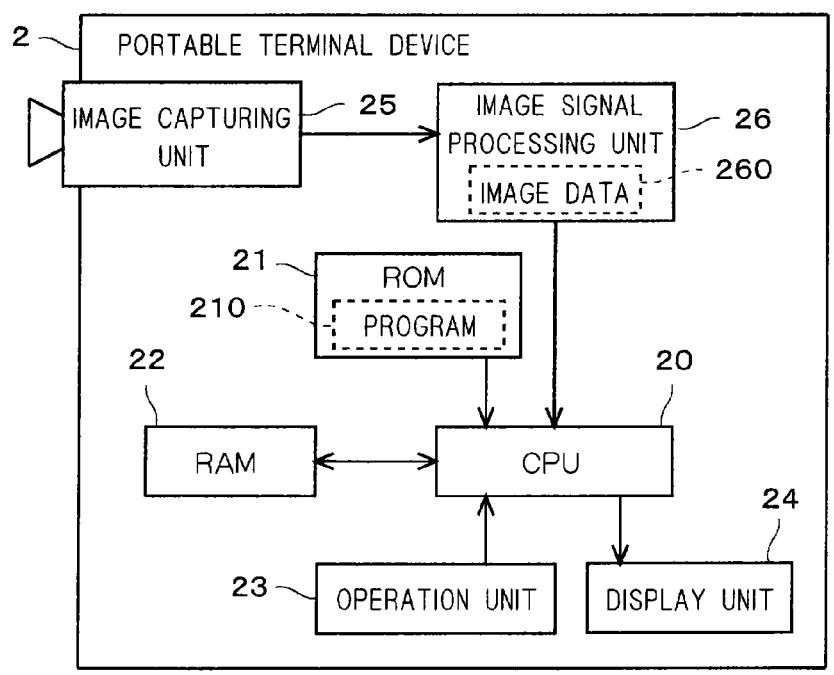
FIG. 7 is a block diagram of the portable terminal device in the still other preferred embodiment.

FIG. 6 shows an appearance of an exemplary portable terminal device 2 in still another preferred embodiment. FIG. 7 is a block diagram of the portable terminal device 2 in the still other preferred embodiment. As shown in FIG. 6, the portable terminal device 2 is designed so that it can be carried by an operator, and can be operated by the operator.

The portable terminal device 2 includes a CPU 20 which controls respective components provided in the portable terminal device 2 by generating control signals, a ROM 21 which stores a program 210 to be executed by the CPU 20, and a RAM 22 to be used as a temporal working area of the CPU 20. Thus, the portable terminal device 2 has the structure and functions as a general computer.

The operation and functions of the CPU 20 will be described later. The RAM 22 is a typical example of a storage device from which data can be read and on which data can be written, but there is no intention to limit the storage device provided in the portable terminal device 2 to a relatively small capacity storage device which allows a rapid access (i.e., RAM 22). The portable terminal device 2 may include a non-volatile storage device, a storage device which allows a relatively low speed access only, a large capacity storage device, or the like, other than the RAM 22, or may be configured to allow the use of a portable storage medium to/from which can be attached and detached.

The portable terminal device 2 also includes an operation unit 23, a display unit 24, an image capturing unit 25, and an image signal processing unit 26.

The operation unit 23 is buttons, a key, a switch or the like which can be operated by an operator. For example, the operation unit 23 has a power button for turning a power of the portable terminal device 2 on. The operation unit 23 also has a touch panel arranged on a surface of the display unit 24 described later, and enables the operator to input an instruction by touching the screen (i.e., touch panel) of the display unit 24.

The display unit 24 has a function of displaying various types of information for the operator. Examples of the display unit 24 include a liquid crystal panel, a lamp, and a LED.

The image capturing unit 25 includes an optical element such as a lens, and a photoelectric conversion element such as a CCD, although the details thereof are not shown. The image capturing unit 25 has a function of converting light incident through the lens to a digital electric signal and transmitting the digital electric signal to the image signal processing unit 26. The image capturing unit 25 in the still other preferred embodiment is provided at a position shown in FIG. 6, for example, and is configured so that the capturing range thereof covers the operator who watches (views) the display unit 24. In other words, in the portable terminal device 2 in the still other preferred embodiment, the operator is captured as an object in image data 260 captured when the operator watches the display unit 24 in a normal posture.

The image capturing unit 25 forms a so-called digital camera widely available in the market and has a function of taking a color photograph (video) at a certain moment. However, for implementing the present invention, it is not necessary for the image capturing unit 25 to have a function of capturing an image in which a human eye can recognize an object as in a color photograph. That is, it is enough that the relative distance between an object and the portable terminal device 2 and a change in the orientation can be detected by capturing light (this is not always visible) from the object, and an infrared camera may be used.

The image signal processing unit 26 is hardware which processes an electric signal representing an image input from the image capturing unit 25 to convert it into image data 260 having a predetermined format. That is, the image data 260 is directly data created by the image signal processing unit 26 and also data captured by the image capturing unit 25. In the portable terminal device 2, the image capturing unit 25 and the image signal processing unit 26 have a function as an image acquisition unit which acquires image data 260 by capturing an image of the surroundings.

In the following description, a portion of the object contained in the image data 260, other than the operator, is referred to as a "background." That is, the "background" may contain a person other than the operator. Moreover, in a case where the operator as the object is not contained in the image data 260, that image data 260 is image data 260 only contains the background. Unless otherwise stated, the "operator" in the object is described as containing not only the body of the operator but also an article worn by the operator. In a case where the operator wears a cap or a hat, for example, the cap or the hat is the "operator" as the object, not the background.

The portable terminal device 2 detects motion of the object in the image data 260 acquired by the image capturing unit 25 and the image signal processing unit 26 based on that image data 260, although the details will be described later. The portable terminal device 2 also detects, based on the motion of the subject, the condition of the operator who is watching the display unit 24 (whether or not the operator is walking, or whether or not the operator is moving on a vehicle). According to the conventional technique for detecting the motion of the operator by detecting the motion of the device itself with an acceleration sensor, an erroneous detection may occur because of the effects of the motion of the vehicle in a case where the operator is on board on a vehicle, for example. On the other hand, in a case of detecting the condition of the operator based on the image data 260, such a problem does not occur.

Figure 8:
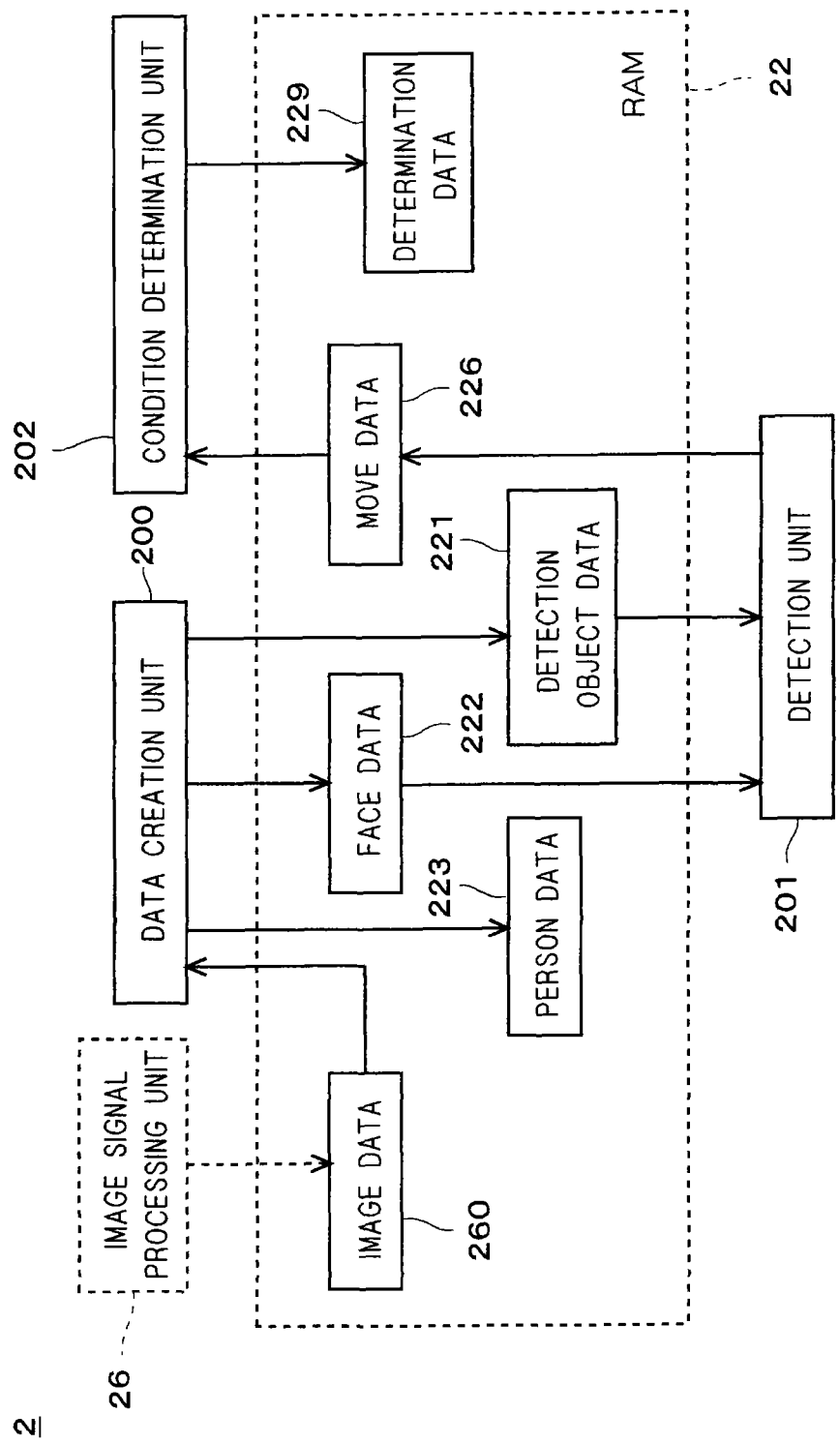
FIG. 8 shows functional blocks provided in the portable terminal device in the still other preferred embodiment, with a data flow.

FIG. 8 is a diagram showing functional blocks provided in the portable terminal device 2 in the still other preferred embodiment, together with a data flow. A data creation unit 200, a detection unit 201, and a condition determination unit 202 shown in FIG. 8 are functional blocks that are implemented by the CPU 20 operating in accordance with the program 210.

The data creation unit 200 analyzes image data 260 obtained by capturing the surroundings, extracts features of an object captured therein, and creates detection object data 221, face data 222, and person data 223.

In a case where the operator is captured in the image data 260, the data creation unit 200 creates the face data 222 based on a portion representing the operator (a portion of the image data 260), and sets a remaining portion of the image data 260 other than the face data 222 as the detection object data 221. In other words, the data creation unit 200 in the still other preferred embodiment has a function of separating the operator (including the face of the operator) and the background from each other. Due to this function, the detection object data 221 is data containing the background only as its object.

For detecting whether or not the operator is walking or moving on a vehicle from the image data 260 to be captured, it is necessary to detect a change in the image data 260 between a state where the operator is a detection object and another state. Please note that the "change" used herein is not limited to the motion, but the present invention provides a technique for detecting the presence/absence of the move of the operator caused by the walking movement or a vehicle based on the motion of the object in the image data 260. Moreover, the "motion of the object" used herein is not the motion of the object in a real space, but refers to the positional change of the pixel representing the object in the image data 260.

On the other hand, it is expected that the operator continues to keep the portable terminal device 2 (display unit 24) at a position where the operator can easily watch the portable terminal device 2, while watching the portable terminal device 2. In other words, irrespective of whether or not the operator is walking or moving on a vehicle, it is highly likely that the relative positional relationship between the operator (especially, the face of the operator) and the portable terminal device 2 is maintained. If the relative positional relationship between the operator and the portable terminal device 2 is maintained, it can be considered that there is almost no motion of the operator in the image data 260 (almost no change of the position in the image data 260, of the pixel representing the operator).

Therefore, even if the face of the operator in the image data 260 is observed as in the technique described in JP-2011-258191-A, it is difficult to determine whether or not the operator is walking, or whether or not the operator is moving on a vehicle. Instead, for detecting such a condition of the operator, it is preferable to perform determination after the portion representing the face of the operator is excluded from the image data 260 so that the effect thereof is excluded. Thus, the data creation unit 200 excludes the face data 222 from the image data 260 and creates the detection object data 221.

As described before, the portable terminal device 2 detects the presence/absence of the move of the operator caused by the walking movement or a vehicle based on the change of the position of the pixel representing the object in the image data 260. Therefore, the portable terminal device 2 has to detect the change of the position within the image data 260 caused by walking or moving on a vehicle of the operator carrying the portable terminal device 2. Conversely, it is preferable to exclude the change of the position (or standstill) occurring independently of the presence or absence of the move caused by the walking movement of the operator or a vehicle, for preventing misrecognition of the presence or absence of the move of the operator caused by the walking movement or a vehicle. In other words, it is preferable to exclude a body moving independently of whether or not the operator is walking or moving on a vehicle, from the detection object.

A portion of the operator as the object, other than the face, is not the "background," of course. Moreover, among objects contained in the image data 260, the portion of the operator as the object other than the face is an object the position of which in the image data 260 may move (or stop moving) independently of whether or not the operator is walking or moving on a vehicle. Therefore, the data creation unit 200 in the still other preferred embodiment excludes the whole operator including the face from the image data 260 to create the detection object data 221 which does not contain the operator as the object.

Moreover, in a case where it has been determined by the feature extraction that another person than the operator is captured in the image data 260, the data creation unit 200 creates person data 223 based on the portion representing that person (a portion of the image data 260). More specifically, in a case where an object that can be regarded as a person is further included in the remaining portion of the image data 260 after the face data 222 is excluded from the image data 260, the portion that can be regarded as that person is extracted and set as person data 223. Then, the remaining portion of the image data 260 after the person data 223 has been excluded from the image data 260 is regarded as the detection object data 221. Therefore, the detection object data 221 in the still other preferred embodiment is data representing a remaining portion after the portion corresponding to the person has been excluded. In this manner, the portable terminal device 2 creates the detection object data 221 by excluding the other person than the operator, as the object the position of which in the image data 260 may be changed independently of whether or not the operator is walking or moving on a vehicle.

Based on the detection object data 221 that is the portion of the image data 260 after at least the face data 222 has been excluded from the image data 260 (the person data 223 has been further excluded in the still other preferred embodiment), the detection unit 201 detects the motion of the object contained in the detection object data 221. The motion of the object referred to herein is the positional change of the pixel representing the object in the detection object data 221. The detection unit 201 in the still other preferred embodiment specifies the direction of move of at least the object in the detection object data 221 (image data 260).

The detection unit 201 also creates move data 226 indicating the specified direction of move. The direction of move indicated by the move data 226 shows a changing direction of the relative positional relationship between the portable terminal device 2 (image capturing unit 25) and the object. Please note that that change of the positional relationship is not always caused only by whether or not the operator is walking or moving on a vehicle. For example, even in a state where the operator is static (not walking), when the hand holding the portable terminal device 2 is moved, the direction of move is detected by the detection unit 201 in accordance with the direction in which the portable terminal device 2 is moved.

The condition determination unit 202 determines whether or not the operator is walking in accordance with the direction of move of the object detected by the detection unit 201. Moreover, the condition determination unit 202 determines whether or not the operator is moving on a vehicle in accordance with the direction of move of the object detected by the detection unit 201. Furthermore, the condition determination unit 202 creates determination data 229 indicating the determination result in accordance with the determination result. A manner is described later in which it is determined by the condition determination unit 202 that "the operator is walking" or "the operator is moving on a vehicle or the like" when which motion of the object has been detected.

The above is the description of the structure and functions of the portable terminal device 2 in the still other preferred embodiment. Next, a condition detection method in which the portable terminal device 2 detects a walking operation of the operator is described.

Figure 9:
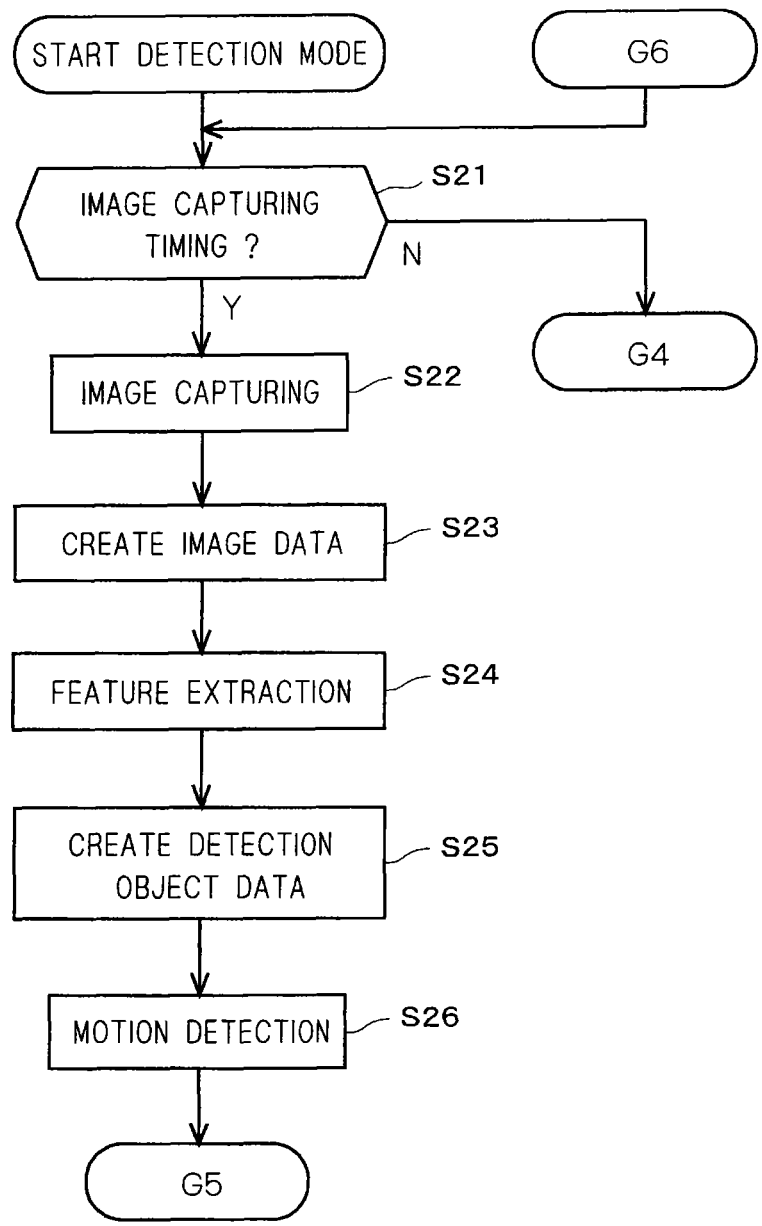
FIG. 9 is a flowchart showing an exemplary operation in a detection mode of the portable terminal device in the still other preferred embodiment.
Figure 10:
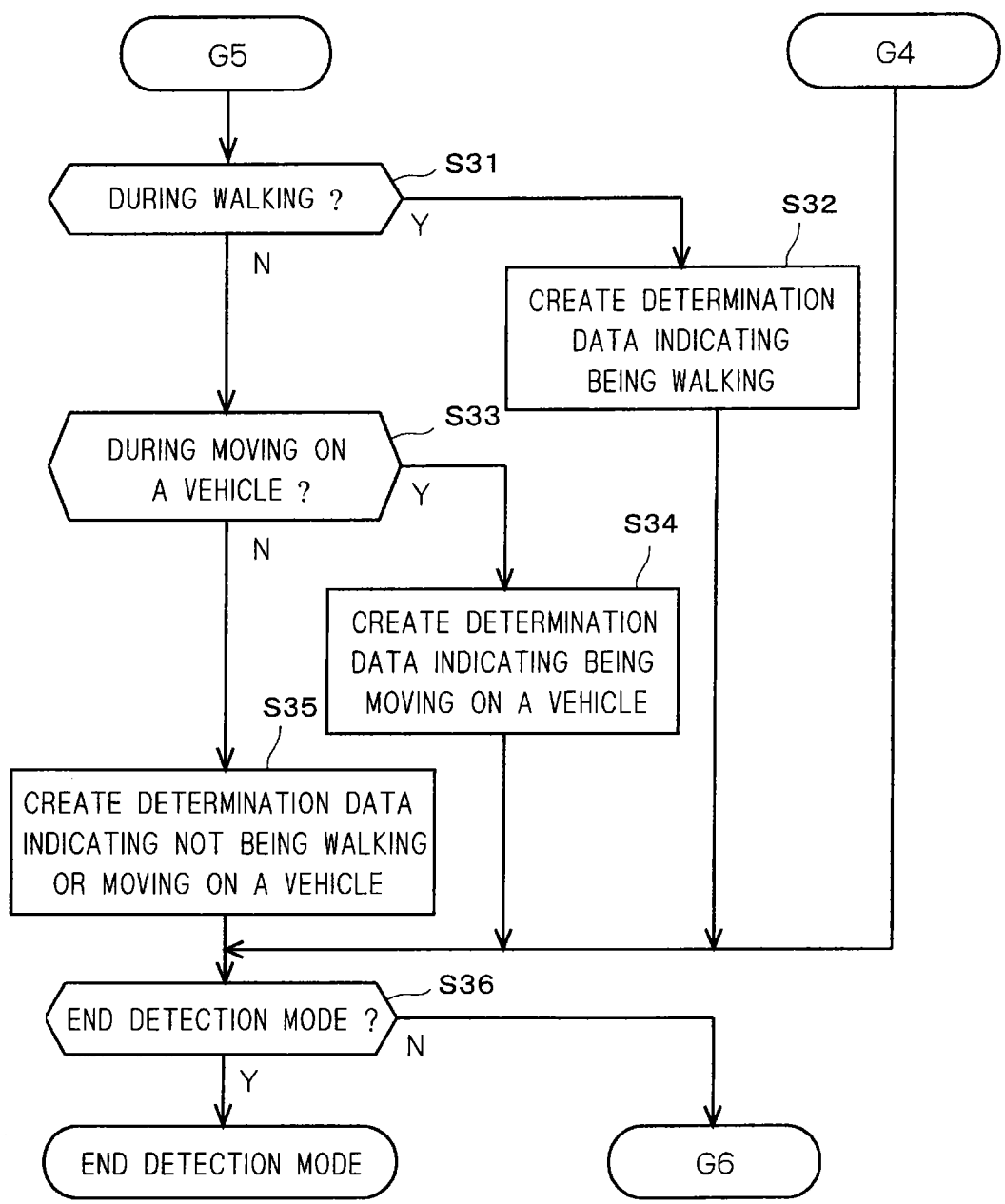
FIG. 10 is a flowchart showing an exemplary operation of the detection mode of the portable terminal device in the still other preferred embodiment.

FIGS. 9 and 10 are flowcharts which exemplify the operation of the portable terminal device 2 in a detection mode in the still other preferred embodiment. The detection mode is an operation mode for detecting (monitoring) the condition of the operator (i.e., whether the operator is walking or moving on a vehicle) in accordance with the condition detection method according to the present invention.

It is assumed that the detection mode has been selected in the portable terminal device 2 prior to execution of the respective steps shown in FIGS. 9 and 10. Selection of the detection mode may be directly carried out by a key operation or a touch panel operation by the operator, for example, or may be automatically carried out, for example, when a specific application which can change its operation in accordance with the condition of the operator is started. Alternatively, it may be determined whether or not the operator as the object is contained in the captured image data 260, and the detection mode may be automatically selected in a case where the operator is contained. The detection mode in the still other preferred embodiment is a mode carried out in parallel to another operation mode, but is not limited thereto. That is, the detection mode may be carried out solely. Unless otherwise described, the respective steps shown in FIGS. 9 and 10 are implemented by the CPU 20 which operates in accordance with the program 210.

When the detection mode is started, the CPU 20 is placed in a state in which it monitors whether or not an image capturing timing has come (Step S21) and whether or not the detection mode is to be ended (Step S36). Hereinafter, this state is referred to as a monitoring state in the portable terminal device 2.

In the monitoring state, in a case where the image capturing timing has come (Yes in Step S21), the image capturing unit 25 performs image capturing (Step S22) and sends an electric signal to the image signal processing unit 26. Then, the image signal processing unit 26 creates image data 260 (Step S23). In this manner, the portable terminal device 2 in the still other preferred embodiment performs image capturing at a regular time interval, so that new image data 260 is stored in the RAM 22.

When the new image data 260 has been stored in the RAM 22, the data creation unit 200 performs feature extraction for the newly created image data 260 by image analysis (Step S24), and creates detection object data 221, face data 222, and person data 223 (Step S25). Thus, the detection object data 221, in which a portion representing the operator as the object and a portion representing a person other than the operator are not contained, is newly created.

When the detection object data 221 has been newly created, the detection unit 201 compares the detection object data 221 created at the last execution of Step S25 and the detection object data 221 created at this execution with each other, thereby detecting the motion of the object between them (Step S26). Hereinafter, one of two units of detection object data 221 to be compared, that is created prior to the other, is referred to as "former detection object data 221" and the other one is referred to as "latter detection object data 221".

The principle of detection of motion of an object by the detection unit 201 is described here.

Figure 11:
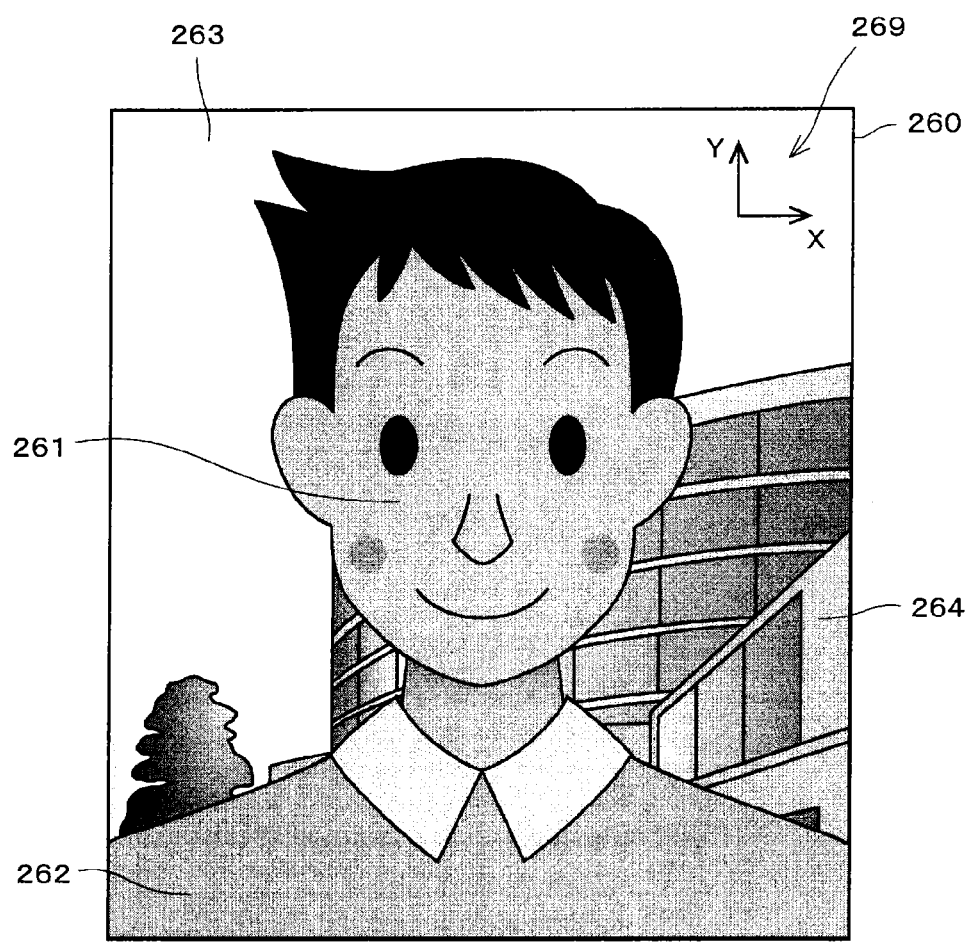
FIG. 11 shows an example of image data in the still other preferred embodiment.

FIG. 11 shows an example of image data 260 in the still other preferred embodiment. Please note orientations 269 in FIG. 11 show directions defined in the image data 260 for convenience, but do not represent the direction of the image data 260.

In FIG. 11 an object 261 is a portion representing the face of an operator and an object 262 is a portion representing the remaining portion of the operator other than the face. An object 263 is a portion representing sky, and an object 264 is a portion representing a building.

The detection unit 201 specifies the axial direction of the face of the operator based on face data 222 (containing the objects 261 and 262) created by the data creation unit 200, and determines Y-axis direction and X-axis direction so that the Y-axis direction is parallel to the axial direction of the face of the operator and goes toward the top of the head of the operator and the X-axis direction is approximately perpendicular to the Y-axis direction. In other words, the detection unit 201 determines the directions 269 (FIG. 11) in the image data 260 (the detection object data 221). A technique described in JP-2011-258191-A, for example, may be used as a method for determining the directions 269 in the image data 260. Alternatively, the directions 269 may be determined in accordance with the orientation of the contents displayed on the display unit 24 or may be fixed with respect to the image capturing unit 25.

The detection unit 201 detects the amount of move of each pixel based on the detection object data 221 between before and after the motion of the object. More specifically, the former detection object data 221 and the latter detection object data 221 are compared with each other, thereby a motion vector of each pixel (that includes both the amount of move and the direction of move) is obtained. That is, a motion vector of the object (object 263, 264) in the detection object data 221 is obtained.

It is not necessary to obtain the motion vector from the detection object data 221 for every pixel. For some pixels, a motion vector of a typical one of them may be obtained. For example, a motion vector may be obtained from the detection object data 221 only for one of adjacent 4 (2×2) pixels, and the thus obtained motion vector may be used as a common motion vector of those 4 pixels.

Then, based on the detected motion vector of each pixel, the detection unit 201 obtains the total number of the pixels that has the same motion vector, and specifies the motion vector corresponding to the largest number of pixels. In other words, the detection unit 201 specifies the motion vector of the largest area (the object having the largest number of pixels) moving in the same way in the former detection object data 221 and the new detection object data 221. Hereinafter, the thus obtained motion vector is referred to as a "motion vector of the largest number of pixels".

On the other hand, for detecting the motion of the portable terminal device 2 based on the presence or absence of the walking movement or moving on a vehicle in accordance with the image data 260, it is preferable to exclude one or more of objects contained in the image data 260, that moves independently of the motion of the portable terminal device 2, from the detection object. This is because the motion of such an object in the image data 260, moving independently of the motion of the portable terminal device 2, does not reflect the motion of the portable terminal device 2 only. In the still other preferred embodiment, the face data 222 and the person data 223 are excluded as described above, for this reason. However, such an object is not always completely removable by the data creation unit 200. Moreover, it is expected that a thing other than a person, which moves independently of the motion of the portable terminal device 2, may be captured as an object in the background.

However, it can be considered that such a thing occupies a smaller area in the image data 260 as compared with a thing which does not move (i.e., a thing most suitable as an index for detecting the motion of the portable terminal device 2) in many cases. This is because many of the objects contained in the background are considered as not moving. Therefore, when some motion vectors are detected, decision by the number of pixels, i.e., so-called decision by majority is employed, thereby the effect of a small thing (object) which moves independently of the motion of the portable terminal device 2 can be suppressed.

Instead of obtaining the number of the pixels having exactly the same motion vector, some differences may be allowed. That is, a range of motion vectors in which the motion vectors can be regarded as representing the same motion may be set, and the number of the pixels in that range may be counted. In the example shown in FIG. 11, the object 263 has the larger number of pixels than the object 264. Thus, the motion vector 263 is specified as the "motion vector of the largest number of pixels".

Furthermore, in a case where a plain wall, a blue sky or the like is contained as an object which occupies a large area in the background, the amount of move in the motion vector of the largest number of pixels detected from the detection object data 221 can be almost zero even if the background has actually moved in association with the motion of the portable terminal device 2. In this case, the detection unit 201 misrecognizes the amount of move as being zero although the portable terminal device 2 has moved.

For example, in the example shown in FIG. 11, the objet 263 is the "sky" and is therefore an object having a low contrast. Therefore, the motion vector of the largest number of pixels, which is specified by the object 263, may be zero irrelevantly to the walking operation of the operator, for example.

Therefore, when the motion vector of the largest number of pixels has been obtained, the detection unit 201 determines whether or not the amount of move in the motion vector of the largest number of pixels is a threshold value or smaller, thereby determining whether or not the motion can be at a motion level at which the object of the motion vector of the largest number of pixels can be regarded as moving actually in the image data 260. When that object has been determined as not moving, the detection unit 201 further determines whether or not that object is a plain object having a low contrast, for checking whether or not the current situation is a situation in which the above-described misrecognition can occur. The further determination is performed by obtaining an edge strength for the pixel which has moved by the motion vector of the largest number of pixels (the pixel representing that object), comparing the obtained edge strength with a threshold value, and regarding that object as being a plain object having a low contrast in a case where the edge strength is the threshold value or less, for example.

When that object has been determined as being a plain object having a low contrast, the detection unit 201 discards the detected motion vector of the largest number of pixels and specifies the next motion vector (i.e., the motion vector having the second largest number of pixels) as a new motion vector of the largest number of pixels. In the example shown in FIG. 11, if the amount of move of the object 263 is the threshold value or smaller, the motion vector of the object 264 is specified as the motion vector of the largest number of pixels. Also in a case where the next or subsequent motion vector is specified as the motion vector of the largest number of pixels, the detection unit 201 performs the above-described determination to determine whether or not the thus specified motion vector is to be employed as the motion vector of the largest number of pixels.

In this manner, in a case where an object having a low contrast such as a plain wall or a blue sky occupies a large area in the background, the portable terminal device 2 changes the detection object to another portion (e.g., a stein, a mark, or a small design pattern in that wall or a telegraph pole or a building in front of that wall). Thus, an accurate motion vector can be obtained as the motion vector of the background and therefore the detection accuracy can be improved.

As described above, the detection unit 201 determines the motion vector of the largest number of pixels in accordance with the motion of the object forming the largest area which moves in the same way (other than a plain object having a low contrast and a small motion) in the background (detection object data 221). The detection unit 201 then obtains an X-axis direction component "x" and a Y-axis direction component "y" of the detected motion vector of the largest number of pixels, thereby creating motion data 226. Thus, the move data 226 is information representing the motion of the object in the image data 260 (the detection object data 221).

When Step S26 has been executed and the move data 226 has been created, the condition determination unit 202 determines whether or not the operator is walking as the condition of the operator in accordance with the move data 226 (Step S31).

It is described that in Step S31 creation of which move data 226 causes the condition determination unit 202 to give a determination of "during walking".

While the operator is walking, the operator usually sets the face portion thereof to face forward in the walking direction. Moreover, it is difficult to expect that the operator is walking while keeping the face thereof inclined. Therefore, the background in the image data 260 is considered as moving in (−Y) direction.

Thus, the condition determination unit 202 determines that the operator is walking in a case where x and y in the move data 226 satisfy both Equations 9 and 10 shown below, and the operator is not walking otherwise.

$$-\delta_y \geq y \qquad \text{Equation 9}$$

$\delta_y$ is a threshold value that is set in advance in accordance with whether or not an object can be regarded as moving in the Y-axis direction and is defined to be larger than 0. That is, Equation 9 is "true" in a case where the object can be regarded as moving in (−Y) direction.

$$\delta_x \geq |x| \qquad \text{Equation 10}$$

$\delta_x$ is a threshold value that is set in advance in accordance with whether or not an object can be regarded as moving in the X-axis direction and is defined to be larger than 0. That is, Equation 10 is "true" in a case where the object can be regarded as not moving in the X-axis direction.

However, even in a case where the operator is not walking, both Equations 9 and 10 shown above are "true" when the operator moves the arm thereof holding the portable terminal device 2 to move the portable terminal device 2 in (+Y) direction. Alternatively, this is the same while the sitting operator is rising from the seat. Therefore, the determination that the operator is walking that has been made only by Equations 9 and 10 may be wrong. In other words, it is necessary to suppress erroneous determination by distinguishing the motion of the arm of the operator and the standing-up operation of the operator.

The walking operation of the operator is considered as an operation continuing for a certain period of time, not performed instantly. To the contrary, it is difficult for the operator to continuously move the portable terminal device 2 in (+Y) direction by moving the arm thereof without walking. This is because when the arm of the operator is extended completely, the portable terminal device 2 cannot be further moved in (+Y) direction. Moreover, the standing-up operation of the operator is also an operation that is finished in a relatively short period of time.

Therefore, the condition determination unit 202 determines that the operator is walking in a case where a state in which both Equations 9 and 10 are satisfied continues for a predetermined period of time, and creates determination data 229 indicating that the operator is walking (Step S32). Otherwise, the condition determination unit 202 determines that the operator is not walking, and further determines whether or not the operator is moving on a vehicle (Step S33).

It is described that the condition determination unit 202 gives the determination that "the operator is moving on a vehicle" in a case where which move data 226 has been created in Step S33.

In a case where the operator is moving on a vehicle, when a vehicle window is captured as image data 260, the background in the image data 260 is considered as moving in a direction parallel to the X-axis.

Thus, the condition determination unit 202 determines that the operator is moving on a vehicle in a case where x and y in the move data 226 satisfy both Equations 11 and 12 shown below, and the operator is not moving on a vehicle otherwise.

$$\delta_y \geq |y| \qquad \text{Equation 11}$$

Equation 11 is "true" in a case where an object can be regarded as not moving with respect to a direction parallel to the Y-axis.

$$\delta_x < |x| \qquad \text{Equation 12}$$

Equation 12 is "true" in a case where the object can be regarded as moving in a direction parallel to the X-axis.

However, even in a case where the operator is not moving on a vehicle, both Equations 11 and 12 shown above are "true" when the operator moves the arm thereof holding the portable terminal device 2 to move the portable terminal device 2 in (±X) direction. Therefore, the determination that the operator is moving on a vehicle that has been made only by Equations 11 and 12 may be wrong. In other words, it is necessary to suppress erroneous determination by distinguishing the motion of the arm of the operator.

The condition in which the operator is moving on a vehicle is not finished instantly, but is expected to continue for a certain period of time. To the contrary, it is difficult for the operator to continuously move the portable terminal device 2 in either (−X) direction or (+X) direction by moving the arm thereof. This is because when the arm of the operator is extended completely, the portable terminal device 2 cannot be further moved.

Therefore, the condition determination unit 202 determines that the operator is moving on a vehicle in a case where a state in which both Equations 11 and 12 are satisfied continues for a predetermined period of time, and creates determination data 229 indicating that the operator is moving on a vehicle (Step S34). Otherwise, the condition determination unit 202 determines that the condition that the operator is walking or moving on a vehicle has not been detected, and creates determination data 229 indicating that fact (Step S35).

The present invention aims to detect the condition of the operator without relying on an acceleration sensor or the like, and therefore the description is made until the determination data 229 is created. How to use the thus created determination data 229 may be decided as appropriate in an application or the like.

For example, the fact that the determination data 229 indicating that the operator is walking has been created may be used as a trigger of an event which is made to occur only while the operator is walking.

Moreover, there is considered an application the start of which is permitted only while the operator is walking. For example, the start time of the move on foot and the moving time may be recorded. By doing this, an application is expected which calculates calorie by walking.

On the other hand, there is an application which is ended during walking (which is prohibited from being used), for example. For example, while the operator is walking, a character input mode may be automatically turned off, or a thing which may cause a danger when being used during walking (e.g., keyboard) may be made unusable. By prohibiting the use of an application or hardware which may cause a danger when being used during walking in this manner, the portable terminal device 2 can prevent an accident.

A camera different from the image capturing unit 25 may be provided to face outwards so that that camera is automatically started during walking and a video captured by that camera is displayed in real time in a sub window. This enables an operator to confirm the condition of the surroundings by the video displayed in the sub window while reading an article in a main window, for example. In other words, the operator can confirm the condition ahead of the portable terminal device 2 while watching the display unit 24. Thus, risks during walking can be suppressed.

Moreover, it is possible to estimate the actual distance of move of the portable terminal device 2 based on the amount (pixels) of move of the object in the image data 260 to obtain a walking speed. In this case, for obtaining an accurate walking speed, the relative distance between the object and the portable terminal device 2 is required, which can be obtained from a distance measuring sensor or a 3D camera, for example.

In addition, it is expected in a situation where the operator is walking that device shake occurs because of vibration, making it difficult for the operator to view the contents displayed on the display unit 24. Therefore, in a case where it has been determined that the operator is walking, it is effective for the portable terminal device 2 to enlarge an image or characters displayed on the display unit 24 or enhance an outline or a character line by making it thicker for improving the visibility.

A current position may be acquired by using a positioning unit such as GPS, so that map information is displayed in a sub window different from a main window that is operating, or the track of the move by walking is recorded.

Please note that the portable terminal device 2 in the still other preferred embodiment gives the determination of "during walking" even when the operator is running or jogging. That is, the case where the portable terminal device 2 has given the determination that "the operator is walking" is not limited to a case where the operator is actually walking, but may be a case where the operator is running, for example. For distinguishing the "walking" and "running" from each other in detail with respect to the operations of the operator, there are considered a method for acquiring a period of move by a vibration sensor to perform determination and a method for performing determination by the speed of move (the speed of move of the pixel of the object in the image data 260), for example.

On the other hand, there is considered a usage in which the output of the acceleration sensor is ignored in an application when the determination data 229 indicating that the operator is moving on a vehicle has been created, for example. That is, it is possible to stop the application or hardware in which malfunction or erroneous detection may be caused, while the operator is moving on a vehicle.

Moreover, it is possible to, in a route guidance application, regard the operator as getting on board, and indicate transfer of vehicles or the destination station guidance or notify the operator of the approach to the destination based on information obtained by route search and information on the current position acquired from GPS or the like.

It can be expected that the output of the GPS is compensated by an expected route of a vehicle (operation route map).

In a case where the portable terminal device 2 has a voice call portion, a ringtone thereof may be turned down or a manner mode or an automatic answering mode may be set when it has been determined that the operator is moving on a vehicle.

Moreover, in a case where an application reproducing a sound is operating, an operation of lowering the reproduction level, displaying a message recommending the use of an ear-phone, or change the sound quality of the reproduced sound to prevent the sound leakage can be expected when it has been determined that the operator is moving on a vehicle.

Applications operated during moving on a vehicle tend to be limited. Therefore, it is possible to store in advance the application which was being operated during moving on a vehicle and display that application in a startup selection menu with priority.

However, the portable terminal device 2 in the still other preferred embodiment can give the determination of "moving on a vehicle" only in a case where the vehicle window is captured. In other words, even if the operator is moving on a vehicle, the determination result in Step S33 is No when the vehicle window is not captured. Therefore, even if the determination result in Step S33 is No, it is preferable in some cases that the application is operating while regarding the condition as "unclear whether or not the operator is moving on a vehicle", instead of giving the determination that "the operator is not moving on a vehicle". That is, it is preferable to configure the application so that, only when the condition determination unit 202 has given the determination that "the operator is moving on a vehicle", the application performs an operation positively using the thus determined condition.

As described above, the portable terminal device 2 has the CPU 20 which controls the operation of the portable terminal device 2 in accordance with the detected condition of the operator (determination data 229). Thus, the portable terminal device 2 can provide a service corresponding to the condition of the operator. Therefore, the operator can use the portable terminal device 2 in a more comfortable and appropriate manner. In a case where an instruction to end the detection mode has been issued, it is determined to be Yes in Step S36 and the detection mode is ended.

As described above, the portable terminal device 2 in the still other preferred embodiment includes the image capturing unit 25 and the image signal processing unit 26 which acquire image data 260 by capturing the surroundings, the detection unit 201 which detects the move of an object in the image data 260 based on detection object data 221 that is a remaining portion of the acquired image data 260 after face data 222 representing the face of the operator is excluded, and the condition determination unit 202 which determines whether or not the operator is walking in accordance with the move of the object detected by the detection unit 201. Thus, even if an acceleration sensor is not provided or in a case where the output of the acceleration sensor is not reliable, the condition of the operator can be detected.

Because the portable terminal device 2 further includes the CPU 20 which controls the operation of the portable terminal device 2 in accordance with the condition of the operator determined by the condition determination unit 202, the portable terminal device 2 can perform an appropriate operation corresponding to that condition. The detected condition of the operator includes whether or not the operator is walking and whether or not the operator is moving on a vehicle.

The detection unit 201 detects the motion of the object based on detection object data 221 which is a remaining portion of the acquired image data 260 after person data 223 representing a person other than the operator is excluded. When the motion detection is performed considering the person in the background, the accuracy may be lowered because the person may move independently of the portable terminal device 2. However, even if the person is captured in the image data 260, the portable terminal device 2 excludes that person and detects the motion of the object. Therefore, it is possible to suppress the lowering of the detection accuracy.

The detection unit 201 detects the amount of move of each pixel based on the detection object data 221 before and after the motion of the object. Then, the detection unit 201 obtains the number of pixels for every amount of move of each pixel based on the thus detected amount of move of each pixel, and detects the motion of the object in accordance with the amount of move of each pixel corresponding to the largest number of pixels. Thus, it is possible to suppress the effect of the object which may move independently of the motion of the portable terminal device 2.

The portable terminal device 2 in the still other preferred embodiment may determine that the operator is walking, even in a case where the operator stands still on an escalator, a moving sidewalk or the like. For suppressing this, there is considered a method for providing a vibration sensor and detecting the presence/absence of vibration in association with walking movement, thereby distinguishing the conditions.

The above description is made for the preferred embodiments of the present invention. However, the present invention is not limited to the above preferred embodiments, but can be modified in various ways.

For example, the respective steps shown in the above preferred embodiments are mere examples, and the order and/or the contents can be changed as long as the same effects can be obtained. For example, the steps may be configured so that, subsequent to Step S2 shown in FIG. 4, Steps S6 to S8 are executed. Moreover, for example, in the still other preferred embodiment, it is described that the determination whether or not the operator is walking is performed and thereafter the determination whether or not the operator is moving on a vehicle is performed. However, the order of those steps can be reversed.

In the display compensation mode in the preferred embodiment and the other preferred embodiment, it is described that image capturing by the image capturing unit 15 and creation of image data 160 by the image signal processing unit 16 are executed irrespective of whether or not the operator is walking. However, the portable terminal device 1 or 1a may be configured to execute creation of the image data 160 only during a period in which the operator is determined as being walking by the determination unit 100.

In some applications or conditions, the display control unit 102 may return the compensated displaying position to the standard displaying position when the walking operator stops walking (i.e., the determination result in Step S6 changes to No again).

The functional blocks shown in the above preferred embodiments are described as being implemented in software by the operation of the CPU 10 (or CPU 20) which operates in accordance with the program 110 (or the program 210). However, a portion or all of those functional blocks may be implemented in hardware by an exclusive electronic circuit.

In the above preferred embodiments, it is described that a portion representing the face or the eyeball of the operator is specified by execution of the feature extraction for the image data 160. However, this process can be implemented by another method than the feature extraction for the image data 160. For example, it is possible to specify that portion by using a neural network.

In the preferred embodiment and the other preferred embodiment, it is described that the determination whether or not the operator is walking is made based on the outputs of the group of sensors 17. However, the walking movement of the operator may be detected by analysis of the image data 160 and detection of the motion of the object characteristic of the walking movement. That is, the determination whether or not the operator is walking may be performed in any way.

It is described that the display control unit 102 controls the displaying position in accordance with whether or not the device shake occurs. However, the display control unit 102 may display the display data 123 that is enlarged, while performing the control of the displaying position. In this case, not only the shake of the screen is suppressed but also the display data 123 is displayed while being enlarged. Thus, the visibility of the display data 123 is improved. Alternatively, determination whether to enlarge the display data 123 or not may be further performed in accordance with the degree of the device shake (the magnitude of the change data 122).

In the still other preferred embodiment described above, it is described that the data creation unit 200 creates the person data 223 for convenience of description. However, the person data 223 is not necessary because the portable terminal device 2 does not refer to the person data 223. Therefore, it is not necessary to create the person data 223. That is, it is enough that the portion corresponding to the person data 223 is excluded in the detection object data 221.

Alternatively, in the still other preferred embodiment, a portion corresponding to the person data 223 is not necessarily excluded in the detection object data 221 used for detection of the move of the object. As described above, the detection unit 201 specifies the motion vector of the largest number of pixels by decision by majority of pixels. It is expected that a person other than the operator occupies a relatively small area in the image data 260, and therefore it is less likely that the motion of the person other than the operator is specified as the motion vector of the largest number of pixels even if the person data 223 is not excluded.

In the still other preferred embodiment, it is described that the data creation unit 200 excludes the portion corresponding to the face data 222 and the person data 223 from the image data 260 to create the detection object data 221. However, the detection object data 221 is not necessarily created. For example, mask data (information indicating an excluded object region) corresponding to the face data 222 and the person data 223 may be created, and the direction of move and the amount of move of the object may be detected while the data in the image data 260 is subjected to determination whether or not that data corresponds to the detection object data 221 in accordance with the mask data.

In the still other preferred embodiment, it is described that feature extraction is performed for the image data 260, thereby specifying the face data 222 that is the portion of the image data 260 representing the operator. However, this process can be implemented by a method other than feature extraction for the image data 260. Normally the position at which the operator is captured in the image data 260 can be approximately identified. Therefore, the portable terminal device 2 may be configured to exclude a portion that is highly likely to contain the operator from the detection object data 221, irrespective of whether or not the operator is actually captured. Alternatively, the identification can be made by using a neural network.

In the still other preferred embodiment, it is described that, when the determination that the operator is walking or moving on a vehicle is given, the duration time of the move in (−Y) direction or (±X) direction as the index of the determination. However, the amount of move of the object (the amount of move in the image data 260) may be used as the index, for example. In other words, when the total amount of move of the object from the start of the move in a specific direction exceeds the amount of move (threshold value) expected in a case where the operator moves its arm, the determination that the operator is walking or moving on a vehicle may be given.

Moreover, in the still other preferred embodiment, the portable terminal device 2 may be configured to include an acceleration sensor, a rotation sensor, a vibration sensor or the like, for improving the detection accuracy of the detection unit 201.

The invention claimed is:

1. A portable terminal device operable by an operator, the portable terminal device comprising:
    circuitry configured to:
        acquire image data by capturing surroundings in capturing periods of a predetermined length, wherein
            the image data includes first image data and second image data,
            the first image data is acquired in a first capturing period,
            the second image data is acquired in a second capturing period, and
            the first capturing period is a former period to the second capturing period;
        generate face data and detection object data from the second image data, the face data representing a face of the operator and articles worn by the operator, and the detection object data being obtained by excluding the face data from the second image data and representing a remaining portion of the second image data other than the face data;
        detect a motion of an object in the second image data based on the detection object data by comparing the detection object data with a former detection object data, the object being included in the detection object data, the motion of the object indicating a positional change of pixels representing the object in the detection object data, and the former detection object data being generated from the first image data acquired at the first capturing period; and
        determine a condition of the operator in accordance with the motion of the object.

2. The portable terminal device according to claim 1, wherein
    the circuitry is further configured to control an operation of the portable terminal device in accordance with the condition of the operator determined by the circuitry.

3. The portable terminal device according to claim 1, wherein
    the condition of the operator includes whether or not the operator is walking.

4. The portable terminal device according to claim 1, wherein
    the circuitry is further configured to:
        generate person data from the second image data, the person data representing a person other than the operator in the second image data; and
        detect the motion of the object based on the detection object data that is a portion of the second image data after the person data is excluded from the second image data.

5. The portable terminal device according to claim 1, wherein
    the circuitry detects an amount of move of each pixel based on the detection object data before and after move of the object.

6. The portable terminal device according to claim 5, wherein
    the circuitry obtains a number of pixels for every amount of the move of each pixel based on the detected amount of the move of each pixel, and detects the notion of the object in accordance with the amount of the move of each pixel of the largest number of pixels.

7. The portable terminal device according to claim 1, wherein
    the condition of the operator includes whether or not the operator is moving on a vehicle.

8. A condition detection method for detecting a condition of a portable terminal device including circuitry, the condition detection method comprising:

acquiring, by the circuitry, image data by capturing surroundings in capturing periods of a predetermined length, wherein
   the image data includes first image data and second image data,
   the first image data is acquired in a first capturing period,
   the second image data is acquired in a second capturing period, and
   the first capturing period is a former period to the second capturing period;
generating, by the circuitry, face data and detection object data from the second image data, the face data representing a face of an operator and articles worn by the operator, and the detection object data being obtained by excluding the face data from the second image data and representing a remaining portion of the second image data other than the face data;
detecting, by the circuitry, a motion of an object in the second image data based on the detection object data by comparing the detection object data with a former detection object data, the object being included in the detection object data, the motion of the object indicating a positional change of pixels representing the object in the detection object data, and the former detection object data being generated from the first image data acquired at the first capturing period; and
determining, by the circuitry, a condition of the operator in accordance with the detected motion of the object.

* * * * *